United States Patent Office 3,417,073
Patented Dec. 17, 1968

3,417,073
METAL MONOAZO DYESTUFFS
Fritz Meininger and Ernst Hille, Frankfurt am Main, and Fritz Osterloh, Bad Soden, Taunus, Germany, assignors to Farbwerke Hoechst Aktiengesellschaft vormals Meister Lucius & Brüning, Frankfurt am Main, Germany, a corporation of Germany
No Drawing. Filed Dec. 15, 1965, Ser. No. 514,105
Claims priority, application Germany, Dec. 24, 1964, F 44,805
7 Claims. (Cl. 260—145)

ABSTRACT OF THE DISCLOSURE

Complex metal dyestuffs having, in the form of the free acids, the formula

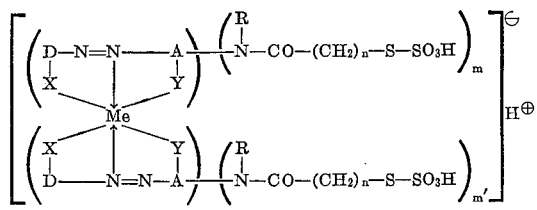

in which D is a benzene or naphthalene diazo component, A is a naphthalene, pyrazolone or acetoacetylaminobenzene azo component, X is hydroxyl or carboxyl in ortho-position to the azo-linkage, Y is hydroxyl or amino in ortho-position or in vicinal position to a carbon atom attached to the azo linkage, R is hydrogen or lower alkyl, Me is chromium or cobalt, $n$ and $m$ stands for 1 or 2, and $m'$ stands for 0, 1 or 2.

---

The present invention relates to complex metal dyestuffs and to processes for their manufacture; in particular, it relates to complex metal dyestuffs which—in the form of the free acids—have the general formula

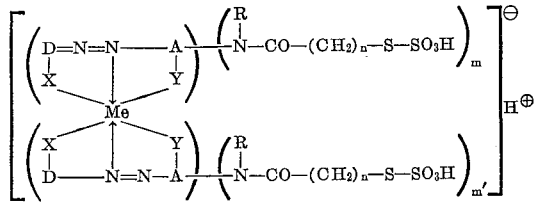

in which D represents the radical of a diazo component of the benzene- or naphthalene-series, A represents the radical of an azo component, X represents a hydroxyl or carboxyl group bound in ortho-position to the azo-linkage, Y represents a hydroxyl or amino group bound in ortho or in vicinal position to a carbon atom attached to the azo linkage, R represents a hydrogen atom or an alkyl group, Me represents chromium or cobalt and $n$ as well as $m$ represent 1 or 2, and $m'$ stands for 0, 1 or 2.

It has now been found that valuable metalliferous azo-dyestuffs containing two dyestuff radicals per metal atom in complex bound form, are obtained by (a) treating a metallizable azo-dyestuff which—in the form of its free acid—has the general formula

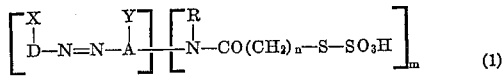  (1)

in which D represents the radical of a diazo component of the benzene- or naphthalene series, A represents the radical of an azo component, X represents a hydroxyl- or carboxyl group bound in ortho-position to the azo-linkage, Y represents a hydroxyl or amino group bound in ortho-, R represents a hydrogen atom or an alkyl group and $n$ as well as $m$ represents 1 or 2, a mixture of two azo-dyestuffs of the Formula 1 mentioned above, or a mixture of an azo-dyestuff of the same Formula 1 and of another metallizable azo-dyestuff, with metal-yielding agents, preferably, with agents yielding cobalt or chromium, (b) reacting a metallizable azo-dyestuff of the above-mentioned Formula 1 with a complex metal compound of an o.o'-dihydroxy-azo-dyestuff or an o-hydroxy-o'-amino-azo-dyestuff containing a metal atom, preferably, a chromium atom per dyestuff molecule in complex-bound form, in the molar ratio of about 1:1, (c) reacting simultaneously or successively a metallizable azo-dyestuff of the general formula

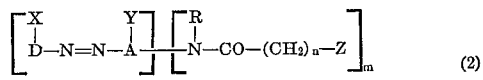  (2)

in which D, A, X, Y, R, $n$ and $m$ have the above-mentioned meanings and Z represents a halogen atom, a mixture of two azo-dyestuffs of the above Formula 2 or a mixture of an azo-dyestuff of the above Formula 2 and another metallizable azo-dyestuff, with salts of the thiosulfuric acid and metal-yielding agents, preferably, agents yielding cobalt or chromium, or (d) reacting 2:1-complex metal compounds of azo-dyestuffs, preferably, such of cobalt or chromium containing one or two dyestuffs of the above Formula 2 per molecule, with salts of the thiosulfuric acid.

The groupings D and A used in the above-mentioned Formulae 1 and 2, can carry any substituent desired. As examples there are mentioned halogen atoms such as atoms of chlorine or of bromine, nitrocyano- or acyl-amino groups such as acetylamino-, benzoylamino- or carbomethoxy-amino groups, unsubstituted or substituted alkyl groups such as methyl-, ethyl- or trifluoromethyl groups, furthermore, alkoxy groups such as methoxy- or ethoxy groups, alkyl-sulfoxide groups or alkyl-sulfonyl groups such as methyl sulfonyl-, ethylsulfonyl- and propylsulfonyl groups, as well as groups imparting solubility in water, such as sulfonic acid groups or carboxylic acid groups, furthermore, sulfonic acid amide groups, N-substituted sulfonic acid amide groups such as N-methyl sulfonic acid amide groups, N-β-hydroxyl-ethyl-sulfonic acid amide groups and N.N.disubstituted sulfonic acid amide groups such as N.N-dimethyl-sulfonic acid amide groups, N.N-diethyl-sulfonic acid amide groups or N.N-di-(β-hydroxyethyl)-sulfonic acid amide groups.

The metal-free azo-dyestuffs of the above-mentioned Formula 1 can be prepared by combining diazo compounds of the benzene- or naphthalene-series, which contain a hydroxy group, or a carboxy group or a hydroxy group esterified with an aromatic sulfonic acid, in 2-position to the diazo group, with azo components which are coupling in ortho- or vicinal position to a hydroxy or amino group, the components chosen being of such a kind that the azo-dyestuffs contain at least once the grouping

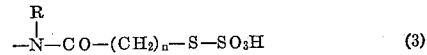  (3)

in which R and $n$ have the meanings given above.

As examples of diazo compounds suitable for the preparation of metallizable azo-dyestuffs, there may be mentioned those of the following amines:

4-(β-thiosulfato-propionylamino)-2-aminophenol,
4-(β-thiosulfato-propionylamino)-anthranilic acid, 5-(β-thiosulfato-propionylamino)-anthranilic acid,
4-(β-thiosulfato-acetylamino)-2-aminophenol,
4- or 5-(thiosulfato-acetylamino)-anthranilic acid,
4-(β-thiosulfato-propionylamino)-6-chloro-2-aminophenol,
6-(β-thiosulfato-propionylamino)-2-aminophenol-4-sulfonic acid,
2-aminophenol-4-methylsulfone,
2-aminophenol-4-propylsulfone,
6-nitro-2-aminophenol-4-sulfonic acid,
6-nitro-2-aminophenol-4-sulfonic acid amide,
6-chloro-2-aminophenol-4-methylsulfone,
5-chloro-2-aminophenol-4-sulfonic acid amide,
6-nitro-2-aminophenol-4-N.N-dimethyl sulfonic acid amide,
2-aminophenol-4-sulfonic acid,
2-aminophenol-4-sulfonic acid amide,
2-aminophenol-4-sulfonic acid-N-methylamide,
2-aminophenol-4-sulfonic acid-N-ethylamide,
2-aminophenol-4-sulfonic acid-N-β-hydroxyethyl amide,
2-aminophenol-4-sulfonic acid-N-phenylamide,
2-aminophenol-4-sulfonic acid-N.N-dimethylamide,
2-aminophenol-4-sulfonic acid-N.N-di-(β-hydroxyethyl)-amide,
4-chloro-2-aminophenol,
4- or 5- or 6-nitro-2-aminophenol,
4.6-dinitro-2-aminophenol,
4-methyl-2-aminophenol,
2-aminophenol, anthranilic acid,
4- or 5- or 6-chloro-anthranilic acid,
4- or 5- or 6-nitro-anthranilic acid,
4.6-dichloro-2-aminophenol,
4-nitro-6-acetylamino-2-aminophenol,
2-amino-1-naphthol-4-sulfonic acid and
6-nitro-2-amino-1-naphthol-4-sulfonic acid.

As examples of azo components suitable for the preparation of the metal-free azo-dyestuffs which are used as starting compounds according to the invention, there may be mentioned the following groups:

acetoacetic acid arylides, pyrazolones, hydroxybenzenes, hydroxynaphthalenes and aminonaphthalenes such as 3- or 4-acetoacetylamino-1-(β-thiosulfato-propionylamino)-benzene,
1-(3'- or 4'-β-thiosulfato-propionylaminophenyl)-3-methyl-5-pyrazolone,
4-(β-thiosulfato-propionylamino)-phenol,
1-(β-thiosulfato-propionylamino)-7-naphthol,
2-(β-thiosulfato-propionylamino)-7-naphthol,
4-(β-thiosulfato-propionylamino)-1-naphthol,
2-(β-thiosulfato-propionylamino)-6-naphthol,
2-(β-thiosulfato-propionylamino)-5-hydroxy-naphthalene-7-sulfonic acid,
2-(β-thiosulfato-propionylamino)-8-hydroxy-naphthalene-3.6-disulfonic acid,
4-acetoacetylamino-1-(N-methyl-β-thiosulfato-propionylamino)-benzene as well as the corresponding thiosulfato-acetylamino compounds, furthermore, hydroxy-benzenes such as p-cresol or p-tert.-amylphenol, 4-acetylamino-phenol,
1-phenyl-3-methyl-5-pyrazolone,
1-phenyl-3-methyl-5-pyrazolones which are substituted in 3'- or 4'-position by a sulfonic acid or by a sulfonic acid amide group, 1-(2'-, 3'- or 4'-chlorophenyl)-3-methyl-5-pyrazolone,
1-(2',5'-dichlorophenyl)-3-methyl-5-pyrazolone,
1-phenyl-5-pyrazolone-3-carboxylic acid or
1-phenyl-5-pyrazolone-carboxylic acid phenylamide,
barbituric acid, hydroxyquinoline,
2.3-hydroxynaphthoic acid amide,
naphthols and naphthylamines such as
6-methyl- or 6-methoxy-2-aminonaphthalene, 2-aminonaphthalene as such and the 2-aminonaphthalene-1-sulfonic acid which couples while splitting off the sulfonic acid group, and which leads to the same dyestuffs as 2-aminonaphthalene, as is known, furthermore, 1-acetylamino-7-hydroxy-naphthalene,
1-methane-sulfonylamino-7-hydroxy-naphthalene,
1-carbethoxyamino-7-hydroxynaphthalene,
5-chloro- as well as 5.8-dichloro-1-hydroxynaphthalene,
2-hydroxynaphthalene,
4.8- or 5.8-dichloro-1-hydroxynaphthalene,
acetoacetic acid esters and acetoacetic acid amides,
1-acetoacetylamino-cyclohexane,
acetoacetylamino-benzene,
1-acetoacetylamino-2.5-dimethyl-benzene,
1-acetoacetylamino-4-methyl-benzene or
1-acetoacetylamino-4-methoxy-benzene,
1-acetoacetylamino-2-, -3-, or -4-chlorobenzene, furthermore, corresponding azo components containing sulfonic acid groups, such as 1-hydroxy-naphthalene-4- or -5- sulfonic acid,
2-acetylamino-8-hydroxynaphthalene-6-sulfonic acid,
3-acetylamino-8-hydroxynaphthalene-6-sulfonic acid and
1-acetylamino-8-hydroxynaphthalene-3.6- or -4.6-disulfonic acid.

In order to convert the azo-dyestuffs of the above-mentioned Formula 1 into the complex metal compounds according to method (a), the dyestuffs are treated, if desired, in mixture with one another or with other metallizable azo-dyestuffs, with one or several metal-yielding agents, preferably, agents yielding cobalt or chromium, in a weakly acid, neutral or weakly alkaline medium in such amounts as to obtain the corresponding 2:1-complex metal compounds.

As metal-yielding agents, there may be used, for example, the following groups: chromic fluoride, chromium sulfate, chromium formiate, chromium acetate, potassium chromium sulfate, cobalt formiate, cobalt acetate and cobalt sulfate as well as mixtures of chromium or cobalt salts and of alkaline metal salts of aliphatic hydroxy carboxylic acid such as tartaric acid, and complex chromium compounds of aromatic ortho-hydroxy carboxylic acids such as salicylic acid.

The metallizable azo-dyestuffs can be reacted, according to the invention, with one or several metal-yielding agents, suitably at elevated temperatures, preferably, in the range between 70 and 100° C., in an aqueous, weakly acid to weakly alkaline medium, if desired, in the presence of an organic solvent such as ethanol, dioxane, glycol, monomethyl glycol or n-butanol.

It is suitable to prepare the 2:1-complex metal dyestuffs of the invention according to method (b) by reacting a metallizable azo-dyestuff of the above-mentioned formula (1) with a 1:1-complex metal dyestuff in an aqueous, neutral to weakly alkaline medium at temperatures ranging from about 50° to 120° C. in a molar ratio of about 1:1. The reaction can also be carried out, if desired, in the presence of an organic solvent which is miscible with water, for example, ethanol.

The process according to embodiment (c) can be carried out by treating simultaneously or successively the metallizable azo-dyestuffs of the above-mentioned formula (2), a mixture thereof or a mixture of such an azo-dyestuff and another metallizable azo-dyestuffs in water or in a mixture of water and of an organic solvent which is miscible with water, under weakly acid, neutral or weakly alkaline conditions, preferably, at a pH-value ranging from 4 to 8, and at an elevated temperature, preferably, in the range of 60° to 100° C., with salts of the thiosulfuric acid and one or several of the metal-yielding agents mentioned above, in such amounts that the complex metal compounds contain two dyestuff radicals per metal atom in complex-bound form.

It is advantageous to prepare the dyestuffs of the invention according to method (d) by reacting the 2:1-complex metal dyestuffs containing, per molecule, one or two dyestuffs of the above-mentioned Formula 2, with salts of the thiosulfuric acid in an aqueous medium or in a mixture of water and of an organic solvent which is miscible with water, for example, ethanol, dioxane, ethylene glycol, ethylene glycol monomethyl ether or ethylene glycol monoethyl ether, at elevated temperatures, preferably, in the range of 60° to 100° C.

The 2:1-complex metal compounds used as starting compounds for this embodiment, preferably, such of cobalt or chromium, are prepared according to usual methods which are known per se. They can be prepared, for example, by treating metallizable azo-dyestuffs of the above-given Formula 2, if desired, in mixture with one another or with other metallizable azo-dyestuffs, with one or several metal-yielding agents under weakly acid, neutral or weakly alkaline conditions, in such amounts as corresponds to more than 0.5, preferably, 0.5 to 0.7 atomic portion of metal per molar portion of the azo compounds to be metallized.

As salts of the thiosulfuric acid used in the different methods of the process of the invention there may be mentioned the alkali metal salts and the alkaline earth metal salts, in particular, sodium thiosulfate both in anhydrous form and as salt containing crystal water. In general, the dyestuffs containing halogenacylamino groups, or their complex metal compounds are reacted with the salts of the thiosulfuric acid in an equivalent ratio. In some cases, it is however advantageous to use an excess amount of thiosulfate.

The metalliferous complex compounds or mixed complex compounds obtainable according to the invention, which contain two dyestuff radicals per metal atom in complex-bound form, are easily soluble in water even in the absence of sulfonic acid groups and of carboxylic acid groups. The complex metal compounds obtained are separated from the aqueous medium by adding sodium or potassium chloride, if desired, after elimination of the organic solvent, they are subsequently filtered off, washed, if desired, and dried. It is particularly advantageous with those products of the invention which are very easily soluble in water, to isolate the dyestuffs by concentrating their solution in vacuo or to dry them by spraying.

The metalliferous azo-dyestuffs obtainable according to the invention, are suitable for dyeing and printing materials of the most different kind, owing to their good solubility in water. The complex metal dyestuffs which are free from sulfonic acid groups and carboxylic acid groups, possess an excellent affinity for nitrogen-containing materials and are, therefore, particularly suitable for dyeing and printing nitrogenous fibers of animal and synthetic origin, such as wool, silk, leather and fibers of polyamide or of polyurethane. The wool dyeings possess a good to excellent fastness to light and to wet processing, especially to washing, fulfilling, potting (severest form of decatizing) and to acidic cross-dyeing. The complex metal dyestuffs containing sulfonic acid groups or carboxylic acid groups, can be used for dyeing and printing natural and regenerated cellulose fibers such as cotton, linen or viscose rayon.

After all, the novel complex metal dyestuffs are applied according to dyeing and printing processes which are generally used in industry. For this purpose, they are applied, to cellulose textile, for example, according to a process used for dyeing or printing reactive dyestuffs, and they are fixed while treating them with an acid-binding agent prior to, during or after the application of the dyestuff, at usual or elevated temperatures. In order to dye textile materials containing nitrogenous fibers, such as, in particular, wool or polyamide-fibers, the novel complex metal dyestuffs are applied to these materials, for example, in a neutral or weakly acid dye bath having a constant or nearly constant pH-value. Dyeing is preferably carried out in the presence of compounds that are used for dyeing nitrogenous textile materials such as, for example, sodium sulfate, ammonium acetate, surface-active compounds such as quaternary ammonium salts and anionic dispersing agents. In this process, the pH-value of the dye bath can also be changed during the dyeing process by adding acids or acid salts or alkalis or alkali metal salts, for example, in such a manner as to start the dyeing process at pH 4 and to carry it up to 7.5 during the process.

The novel complex metal dyestuffs have a variety of tints, for example, blue, violet, grey, orange-colored, yellow, brown and black tints. The deep dyeings and prints obtained with the novel dyestuffs, are distinguished by good fastness properties, in particular, to vigorous washing and to the action of light.

The novel complex metal dyestuffs are furthermore very stable to alkalis and have a very good solubility in water, which is maintained to its full extent even in the absence of sulfonic acid groups and carboxylic acid groups.

The following examples serve to illustrated the invention, but they are not intended to limit it thereto, the parts being by weight unless otherwise stated.

EXAMPLE 1

15.4 parts of 5-nitro-2-aminophenol were diazotized with 25 parts by volume of 4 N-sodium nitrite solution in 500 parts by volume of water and 25 parts by volume of concentrated hydrochloric acid at 0°–5° C. After the diazo solution had been adjusted to pH 7.5–8 by adding sodium carbonate, 37.6 parts of the potassium salt of 2-(β-thiosulfato-propionylamino)-7-naphthol of the formula

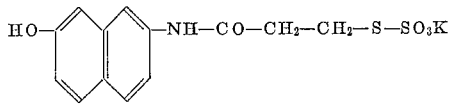

were introduced in portions. After the coupling process had been terminated, the dyestuff solution was adjusted to pH 6 with dilute hydrochloric acid, cleared in the heat and the dyestuff was isolated by salting out with 20% of sodium chloride (referred to the volume of the solution).

The humid dyestuff was dissolved together with 25 parts of chrome alum in 900 parts by volume of water, the solution was adjusted to pH 5.8–6 by adding crystallized sodium acetate, and the whole was stirred under reflux condensing. The dyestuff solution was cleared in hot condition and the dyestuff was salted out with 20% of sodium chloride and 10% of potassium chloride (referred to the volume of the solution). The product was the 2:1-complex chromium compound of the dyestuff of the formula

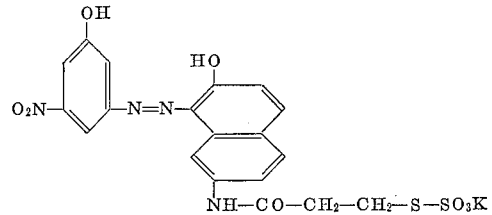

The complex metal dyestuff dyed wool and polyamides bluish grey tints of very good fastness to washing and to light in a weakly acid or neutral dye bath.

The potassium salt of 2-(β-thiosulfato-propionylamino)-7-naphthol used as coupling component, could be prepared in the following manner:

125 parts of 2-(β-chloropropionylamino)-7-naphthol and 136.5 parts of sodium thiosulfate containing crystal water, were stirred under reflux condensing in a mixture of 800 parts by volume of ethanol and 800 parts by volume of water for 3 hours. After the ethanol had been distilled off in vacuo, the remaining aqueous solution was cleared, the reaction product was isolated by salting out with 20% of sodium chloride and 10% of potassium chloride (referred to the volume of the solution) and dried in vacuo at 40° C. The product contained 74–75% of the potassium salt of 2-(β-thioslufato-propionylamino)-7-naphthol.

The content of coupling component was ascertained by determining the coupling value, for example, by reacting an aliquot part of the solution of the reaction product with an adjusted solution of 3-nitrophenyl-diazonium-chloride.

EXAMPLE 2

53.1 parts of the azo-dyestuff described in Example 1, composed of diazotized 5-nitro-2-aminophenol and 2-(β-thiosulfato-propionylamino)-7-naphthol, and 14.2 parts of crystallized cobalt sulfate were dissolved in 1,000 parts by volume of water. After the solution had been adjusted to pH 5.8–6 by adding sodium acetate, the whole was stirred for 2 hours at 70–80° C. The dyestuff solution was cleared in hot condition and the dyestuff was isolated by salting out with 20% of sodium chloride (referred to the volume of the solution). The product was the 2:1-complex cobalt compound. After the usual dyeing methods, there were obtained on wool, bluish grey tints of very good fastness to washing and of good fastness to light.

EXAMPLE 3

53.1 parts of the dyestuff of the formula

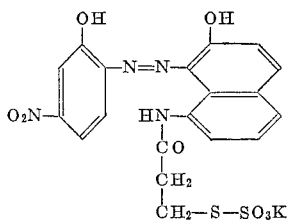

obtainable by coupling diazotized 5-nitro-2-aminophenol with the potassium salt of 1-(β-thiosulfato-propionylamino)-7-naphthol in a weakly alkaline solution, were reacted with 25 parts of chrome alum under the conditions described in Example 1 and were isolated by salting out with 20% of sodium chloride (referred to the volume of the solution). The product was the 2:1-complex chromium compound of the dyestuff described above, and it dyed wool bluish grey tints of very good fastness to washing and good fastness to light in a weakly acid or neutral solution.

The potassium salt of 1-(β-thiosulfato-propionylamino)-7-naphthol used as coupling component, could be prepared by reacting 1-(β-chloropropionylamino)-7-naphthol with sodium thiosulfate. After the reaction mixture had been worked up, there was obtained an aqueous solution from which the reaction product of the formula

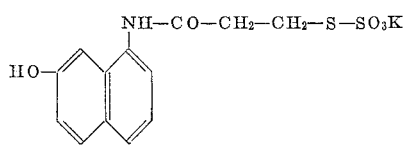

could be isolated by salting out with 20% of sodium chloride and 10% of potassium chloride (referred to the volume of the solution). After drying in vacuo, there was obtained a grey powder which contained 68–69% of the potassium salt of 1-(β-thiosulfato-propionylamino)-7-naphthol.

EXAMPLE 4

When 53.1 parts of the dyestuff described in Example 3, paragraph 1, were treated with 14.2 parts of cobalt sulfate under the conditions described in Example 2, there was obtained after salting out with sodium chloride the 2:1-complex cobalt compound of the azo-dyestuff described in Example 3, paragraph 1, which dyed wool bluish grey tints of very good fastness to washing and light.

EXAMPLE 5

55 parts of the dyestuff of the formula

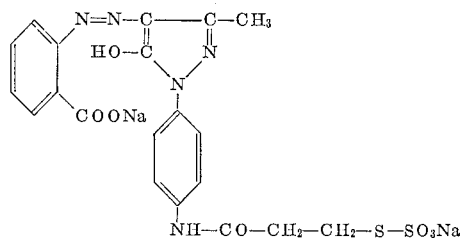

obtainable by coupling diazotized anthranilic acid with the sodium salt of 1-(4'-[β-thiosulfato-propionylamino]-phenyl)-3-methyl-5-pyrazolone, and 25 parts of chrome alum were dissolved in 600 parts by volume of water and, after the pH-value of the solution had been adjusted to 5.5–6 with crystallized sodium acetate, the whole was stirred for 90 minutes under reflux condensing. The dyestuff solution was cleared in hot condition and the dyestuff was salted out with 20% of sodium chloride (referred to the volume of the solution). There was obtained the 2:1-complex chromium compound of the dyestuff described above as a brown powder which was very easily soluble in water. The complex metal dyestuff showed an excellent affinity for wool which was dyed orange-colored tints of very good fastness to washing and light in a weakly acid or neutral dye bath.

The sodium salt of 1-(4'-[β-thiosulfato-propionylamino]-phenyl)-3-methyl-5-pyrazolone used as coupling component, could be prepared in the following manner:

140 parts of 1-(4'-[β-chloropropionylamino]-phenyl)-3-methyl-5-pyrazolone and 136.5 parts of sodium thiosulfate containing crystal water, were stirred under reflux condensing in a mixture of 800 parts by volume of ethanol and 800 parts by volume of water for 3 hours. After the ethanol had been distilled off in vacuo, a small amount of a water-insoluble precipitate separated from the aqueous phase remaining and was filtered off. The solution obtained which contained the sodium salt of 1-(4'-[β-thiosulfato-propionylamino]-phenyl)-3-methyl-5-pyrazolone, could be used directly for subsequent reactions, after the content of coupling component had been ascertained by determining the coupling value.

EXAMPLE 6

55.3 parts of the dyestuff of the formula

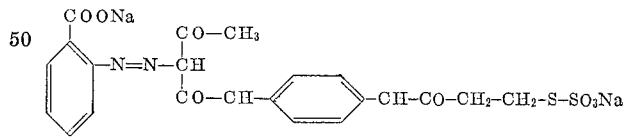

obtained by coupling diazotized anthranilic acid with the sodium salt of 4-acetoacetylamino-1-(β-thiosulfato-propionylamino)-benzene, and 25 parts of chromium alum were dissolved in 600 parts by volume of water and, after the pH-value had been adjusted to 5.5–6 with crystallized sodium acetate, the whole was stirred for 90 minutes under reflux condensing. The dyestuff solution was cleared in hot condition and the dyestuff was salted out with 20% of sodium chloride (referred to the volume of the solution). The product was the 2:1-complex chromium compound of the azo compound described above. The complex metal dyestuff dyed wool neutrally yellow tints of very good fastness to washing and to light after the usual dyeing processes.

The sodium salt of 4-acetoacetylamino-1-(β-thiosulfato-propionylamino)-benzene used as coupling component could be prepared in the following manner:

138 parts of 4-amino-1-(β-thiosulfato-propionylamino)-benzene present in the form of the inner salt, were suspended in 600 parts by volume of water and were dissolved by adding 27 g. of anhydrous sodium carbonate.

While vigorously stirring the solution, 44 parts of diketene were introduced dropwise at 15–20° C. while the pH-value of the solution was maintained at 6.5–7 by adding sodium carbonate. Subsequently, stirring was continued for 30 minutes. The solution obtained which contained the reaction product of the formula

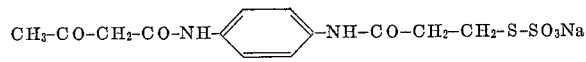

could be used directly for subsequent reactions.

EXAMPLE 7

56.7 parts of the dyestuff of the formula

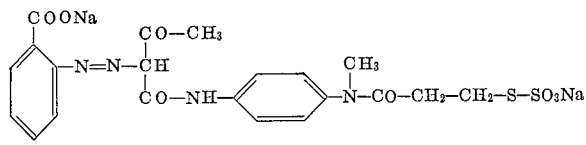

which could be prepared by coupling diazotized anthranilic acid with the sodium salt of 4-acetoacetylamino-(N-methyl-N-β-thiosulfato - propionyl) - anilide, were reacted with 25 parts of chrome alum in the manner described in Example 6, and the substance was salted out with 20% of sodium chloride (referred to the volume of the solution). The novel 2:1-complex chromium compound of the above-described azo-dyestuff had dyeing properties similar to those of the dyestuff described in Example 6.

4-acetoacetylamino-(N-methyl-N-β-thiosulfato - propionyl)-anilide used as coupling component, could be prepared by reacting 4-amino-(N-methyl-N-β-thiosulfato-propionylamino)-benzene with diketene in an aqueous solution.

EXAMPLE 8

176.9 parts of the sodium salt of 1-(β-chloropropionyl-amino)-8-naphthol-3.6-disulfonic acid and 150 parts of sodium thiosulfate containing crystal water were stirred under reflux condensing in 1,000 parts by volume of water for 3 hours. The solution obtained which contained the reaction product of the formula

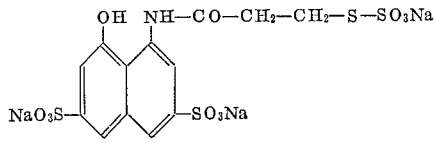

was filtered while still hot and filled up with water to 1,500 parts by volume.

18.9 parts of 2-aminophenol-4-sulfonic acid were diazotized with 25 parts by volume of 4 N-sodium nitrite solution in 100 parts by volume of water and 15 parts by volume of concentrated hydrochloric acid at 0–5° C. After the diazonium solution had been neutralized with sodium carbonate, 500 parts by volume of the solution of the reaction product described above, were added. After the coupling process had been terminated, the dyestuff formed was salted out with 20% of sodium chloride and 10% of potassium chloride (referred to the volume of the solution).

84 parts of the dyestuff obtained and 25 parts of the chrome alum were dissolved in 400 parts by volume of water. The solution was adjusted to pH 6 by adding crystallized sodium acetate, and was stirred under reflux condensing for 90 minutes. When the reaction was complete, the dyestuff solution was filtered while still hot and evaporated to dryness in vacuo at 60° C. The product was the 2:1-complex chromium compound of the dyestuff of the formula

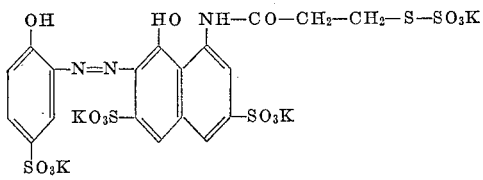

There were obtained, on cotton, deep blue prints of good fastness to washing and light in the presence of sodium carbonate.

EXAMPLE 9

67.6 parts of the dyestuff of the formula

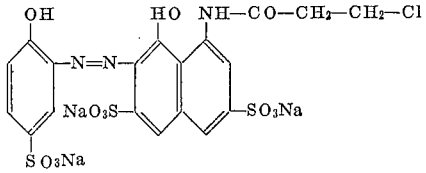

and 30 parts of sodium thiosulfate containing crystal water, were stirred under reflux condensing in 400 parts by volume of water for 3 hours. Subsequently, the dyestuff solution was filtered in hot condition and the dyestuff was salted out by adding 20% of sodium chloride and 10% of potassium chloride (referred to the volume of the solution).

84 parts of the dyestuff obtained and 25 parts of chrome alum were dissolved in 400 parts by volume of water. The solution was adjusted to pH 6 by adding crystallized sodium acetate, and stirred under reflux condensing for 90 minutes. When the reaction was complete, the dyestuff solution was filtered in hot condition and evaporated to dryness in vacuo at 60° C. The product was the 2:1-complex chromium compound of the dyestuff of the formula

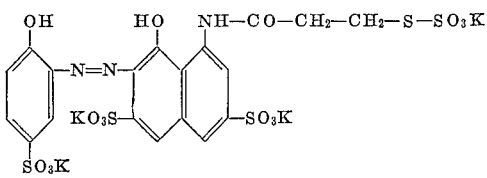

and was identical with the 2:1-complex chromium dyestuff described in Example 8.

EXAMPLE 10

67.6 parts of the dyestuff of the formula

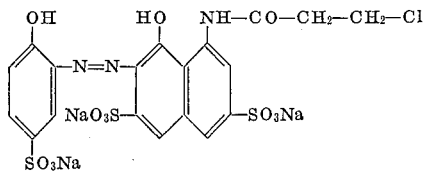

25 parts of chrome alum and 30 parts of sodium thiosulfate containing crystal water, were dissolved in 500 parts by volume of water. By adding sodium acetate, the solution was adjusted to pH 6 and stirred for 3 hours under reflux condensing. Subsequently, the dyestuff solution was filtered in hot condition and evaporated to dryness in vacuo at 60° C.

The product was the 2:1-complex chromium compound of the dyestuff of the formula

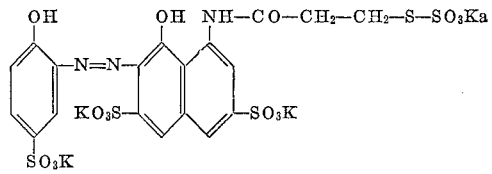

and was identical with the 2:1 complex chromium dyestuff described in Examples 8 and 9.

EXAMPLE 11

61.7 parts of the dyestuff of the formula

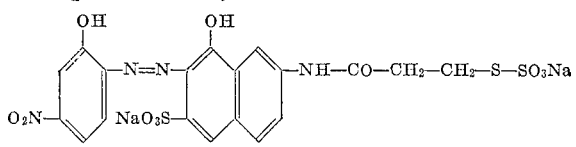

obtainable by coupling diazotized 5-nitro-2-aminophenol with the sodium salt of 2-(β-thiosulfato-propionylamino)-8-naphthol-6-sulfonic acid, were reacted with 25 parts of chrome alum in the manner described in Example 8, and were isolated by adding sodium chloride. There was obtained the 2:1-complex chromium compound of the dyestuff of the above-mentioned formula, which dyed wool greyish blue tints of good fastness to washing and light in weakly acid or neutral bath.

By using 60.3 parts of the dyestuff of the formula

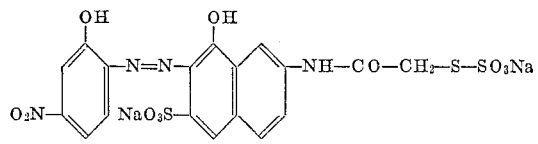

instead of 61.7 parts of the metal-free dyestuff described above, there was obtained—after reaction with 25 parts of chrome alum—a 2:1-complex chromium dyestuff which dyed wool greyish blue tints of good fastness to washing and light in a weakly acid or neutral bath.

EXAMPLE 12

53.5 parts of the 2:1-complex chromium compound of the dyestuff of the formula

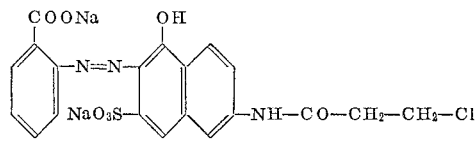

and 30 parts of sodium thiosulfate containing crystal water, were stirred under reflux condensing in 500 parts by volume of water for 3 hours. Subsequently, the dyestuff solution was cleared in hot condition and the dyestuff was salted out with sodium chloride. The product was the 2:1-complex chromium compound of the dyestuff of the formula

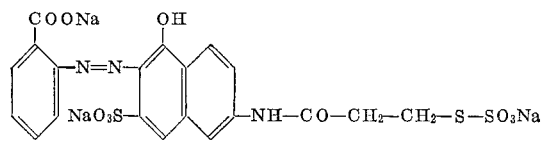

The complex metal dyestuff dyed cotton red brown tints which showed good fastness properties to washing and to action of light, in the presence of sodium carbonate.

EXAMPLE 13

12.5 parts of chromium triacetate of the formula $Cr(C_2H_3O_2)_3 \cdot H_2O$ and 30 parts of sodium thiosulfate containing crystal water were dissolved in 800 parts by volume of water. The solution was adjusted to pH 5.5–6 with sodium acetate and after an addition of 800 parts by volume of ethanol and 40.4 parts of the dyestuff of the formula

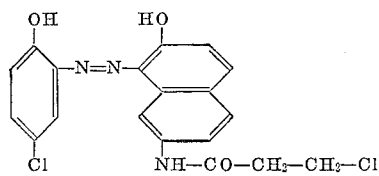

the whole was stirred under reflux condensing for 3 hours. Subsequently, the ethanol was distilled off in vacuo and the aqueous solution remaining was separated by filtration from a small amount of a water-insoluble residue. The 2:1-complex chromium dyestuff formed was isolated by adding 20% of sodium chloride and 10% of potassium chloride (referred to the volume of the solution) and was dried in vacuo at 40° C. There was obtained a black-blue powder which dissolved easily in water. After the usual dyeing processes, deep violet tints of very good fastness to washing and good fastness to light were obtained on wool.

The same dyestuff was obtained by reacting the dyestuff of the formula

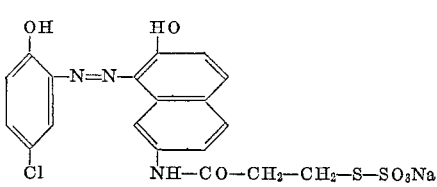

with chrome alum.

EXAMPLE 14

39.5 parts (0.1 mol) of the 1:1-complex chromium compound of the dyestuff of the formula

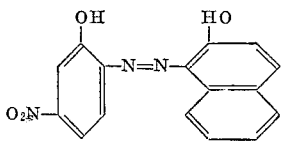

which had been prepared by coupling diazotized 5-nitro-2-amino-phenol with β-naphthol, and 55.3 parts of the dyestuff of the formula

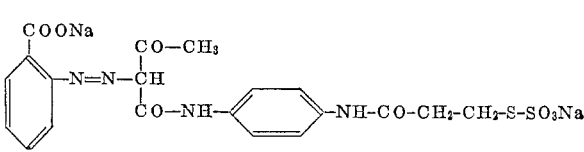

obtainable by coupling diazotized anthranilic acid with 4-acetoacetylamino-(β-thiosulfato - propionyl) - anilide, were dissolved in a mixture of 800 parts by volume of ethanol and 800 parts py volume of water. After the pH-value of the solution had been adjusted to 7 by adding sodium acetate, the whole was stirred for 3 hours under reflux condensing. Subsequently, the ethanol was distilled off in vacuo, the aqueous solution remaining behind, was cleared in hot condition and the mixed 2:1-complex chromium dyestuff was isolated by adding 20% of sodium chloride (referred to the volume of the solution). The novel dyestuff dyed wool neutrally green tints of very good fastness to washing and good fastness to light in a weakly acid or neutral dye bath.

EXAMPLE 15

48.8 parts (0.1 mol) of the 1:1-complex chromium compound of the dyestuff of the formula

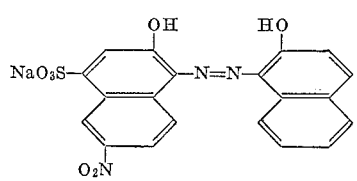

which could be prepared by coupling 1-diazo-2-naphthol- 6-nitrosulfonic acid with β-naphthol, and 55.3 parts of the dyestuff of the formula

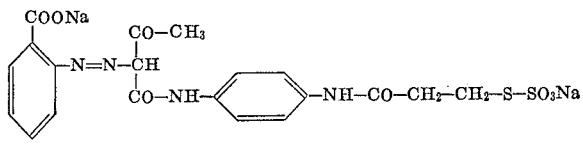

obtainable by coupling diazotized anthranilic acid with 4-acetoacetylamino-(β-thiosulfato - propionyl) - anilide, were dissolved in 1,000 parts by volume of water. After the pH-value of the solution had been adjusted to 7 by adding sodium acetate, the whole was stirred for 90 minutes under reflux condensing. The dyestuff solution was filtered in hot condition and the mixed 2:1-complex chromium dyestuff was isolated by adding 20% of sodium chloride (referred to the volume of the solution). The novel dyestuff dyed wool olive-colored tints of good fastness to washing and light in an acid bath.

EXAMPLE 16

26.5 parts of the dyestuff of the formula

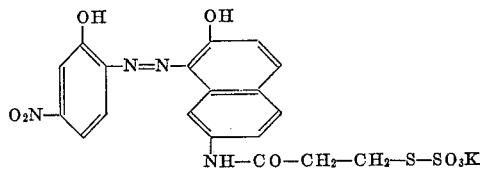

obtainable by coupling diazotized 5-nitro-2-amino-phenol with the potassium salt of 2-(β-thiosulfato-propionyl-amino)-7-naphthol, 27.5 parts of the dyestuff of the formula

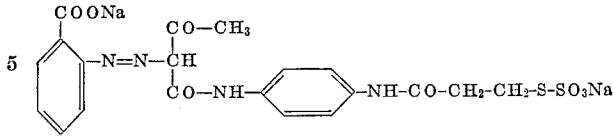

which could be obtained by coupling diazotized anthranilic acid with the sodium salt of 4-acetoacetylamino-1-(β-thiosulfato-propionylamino)-benzene, and 25 parts of chrome alum were dissolved in 600 parts by volume of water. The solution was adjusted to pH 6 by adding crystallized sodium acetate, and was stirred for 3 hours under reflux condensing. When the reaction was complete, the solution was cleared in hot condition and the dyestuff was salted out by adding 20% of sodium chloride (referred to the volume of the solution). The product was the mixed 2:1-complex chromium compound of both the dyestuffs mentioned above. It provided, on wool, olive-colored tints of very good fastness to washing and good fastness to light in a weakly acid or neutral solution.

When the two dyestuffs mentioned above were reacted with 14.5 parts of crystallized cobalt sulfate instead of chrome alum at pH 5.5–6 and at a temperature ranging from 70 to 80° C., the mixed 2:1-complex cobalt compound of the two dyestuffs was obtained. This product provided, on wool, grey tints of very good fastness to washing and good fastness to light after the usual dyeing processes.

In the following tables, there are mentioned further 2:1-complex metal dyestuffs and their tints on wool (abbreviated in the tables with w) or on cotton (abbreviated with c) which can be prepared according to the embodiments described in the above examples.

Table 1.—Symmetric 2:1-complex metal dyestuffs

| Example | Diazocomponent | Azocomponent | Metal | Tint |
|---|---|---|---|---|
| 1 | 2-amino-4-nitro-benzoic acid | HO–[naphthyl]–NH–CO–CH$_2$–CH$_2$–S–SO$_3$H | Cr | Red brown (w). |
| 2 | do | HO–[naphthyl]–NH–CO–CH$_2$–CH$_2$–S–SO$_3$H | Co | Brown (w). |
| 3 | 4-nitro-2-amino-phenol | HO–[naphthyl]–NH–CO–CH$_2$–CH$_2$–S–SO$_3$H | Cr | Currant (w). |
| 4 | do | HO–[naphthyl]–NH–CO–CH$_2$–CH$_2$–S–SO$_3$H | Co | Red brown (w). |
| 5 | 2-aminobenzoic acid | HO–[naphthyl]–NH–CO–CH$_2$–CH$_2$–S–SO$_3$H | Cr | Do. |
| 6 | do | HO–[naphthyl]–NH–CO–CH$_2$–CH$_2$–S–SO$_3$H | Co | Brown (w). |
| 7 | 4-chloro-2-amino-phenol | HO–[naphthyl]–NH–CO–CH$_2$–CH$_2$–S–SO$_3$H | Co | Bluish red (w). |
| 8 | 5-nitro-2-amino-phenol | HO–[naphthyl]–NH–CO–CH$_2$–CH$_2$–S–SO$_3$H | Co | Blue grey (w). |

TABLE 1—Continued

| Example | Diazocomponent | Azocomponent | Metal | Tint |
|---|---|---|---|---|
| 9 | 6-nitro-2-amino-phenol-4-(β-hydroxyethyl)-sulfone. | (1-NH-CO-CH₂-CH₂-S-SO₃H, 7-OH naphthalene) | Cr | Do. |
| 10 | do | (1-NH-CO-CH₂-CH₂-S-SO₃H, 7-OH naphthalene) | Co | Do. |
| 11 | 4-nitro-2-amino-phenol | (1-NH-CO-CH₂-CH₂-S-SO₃H, 7-OH naphthalene) | Cr | Olive-colored (w). |
| 12 | do | (1-NH-CO-CH₂-CH₂-S-SO₃H, 8-OH naphthalene) | Co | Blue-violet (w). |
| 13 | 2-amino-benzoic acid | CH₃-CO-CH₂-CO-NH-C₆H₄-NH-CO-CH₂-CH₂-S-SO₃H | Co | Yellow (w). |
| 14 | 5-nitro-2-amino-phenol | CH₃-CO-CH₂-CO-NH-C₆H₄-NH-CO-CH₂-CH₂-S-SO₃H | Cr | Red (w). |
| 15 | 2-amino-benzoic acid | CH₃-CO-CH₂-CO-NH-C₆H₄-N(CH₃)-CO-CH₂-CH₂-S-SO₃H | Co | Yellow (w). |
| 16 | 5-nitro-2-aminophenol | (pyrazole: HO-C=N-N(C₆H₄-NH-CO-CH₂-CH₂-S-SO₃H)-C(CH₃)=CH) | Cr | Ruby (w). |
| 17 | 2-aminobenzoic acid | (1-OH, 2-NH-CO-CH₂-CH₂-S-SO₃H, 5,7-di-SO₃H naphthalene) | Cr | Grey blue (c). |
| 18 | 5-nitro-2-aminophenol | (1-OH, 2-NH-CO-CH₂-CH₂-S-SO₃H, 5,7-di-SO₃H naphthalene) | Co | Do. |
| 19 | 2-amino phenol-4-sulfonic acid | (1-OH, 2-NH-CO-CH₂-CH₂-S-SO₃H, 5,7-di-SO₃H naphthalene) | Co | Violet (c). |

TABLE 1—Continued

| Example | Diazocomponent | Azocomponent | Metal | Tint |
|---|---|---|---|---|
| 20 | do | 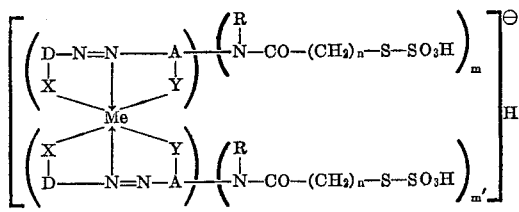 | Cr | Grey blue (c). |
| 21 | 5-nitro-2-aminophenol | (structure with OH, HO₃S, NH—CO—CH₂—CH₂—S—SO₃H) | Co | Grey blue (c and w). |
| 22 | do | (structure with OH, HO₃S, NH—CO—CH₂—CH₂—S—SO₃H) | Co | Blue-violet (c). |

We claim:

1. Complex metal dyestuffs which possess in the form of the free acids the formula $$\left[\begin{array}{c}\left(D-N=N-A\atop X\searrow\nearrow Y\right)\left(\begin{array}{c}R\\N-CO-(CH_2)_n-S-SO_3H\end{array}\right)_m\\Me\\\left(X\nwarrow\swarrow Y\atop D-N=N-A\right)\left(\begin{array}{c}R\\N-CO-(CH_2)_n-S-SO_3H\end{array}\right)_{m'}\end{array}\right]^{\ominus}H^{\oplus}$$

in which D represents a radical of the benzene- or naphthalene-series, A represents the radical of an azo component of the naphthalene, pyrazolone or acetoacetylaminobenzene series, X represents a hydroxyl or carboxyl group bound in ortho-position to the azo-linkage, Y represents a hydroxyl or amino group bound in ortho-position or in vicinal position to a carbon atom attached to the azo linkage, R represents a hydrogen atom or a lower alkyl group, Me represents chromium or cobalt, $n$ and $m$ stand for 1 or 2 and $m'$ stands for 0, 1 or 2.

2. The dyestuff of the formula

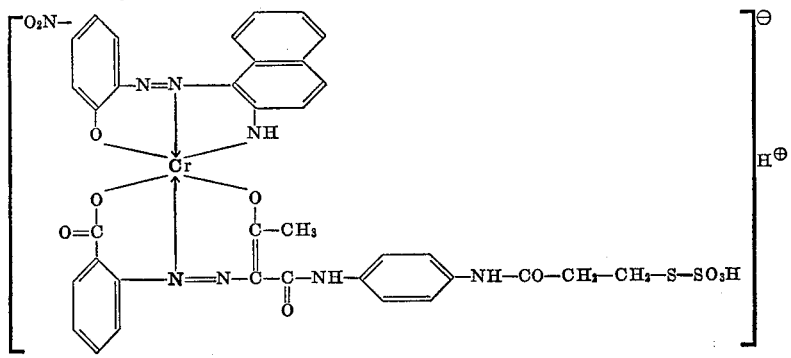

3. The dyestuff of the formula

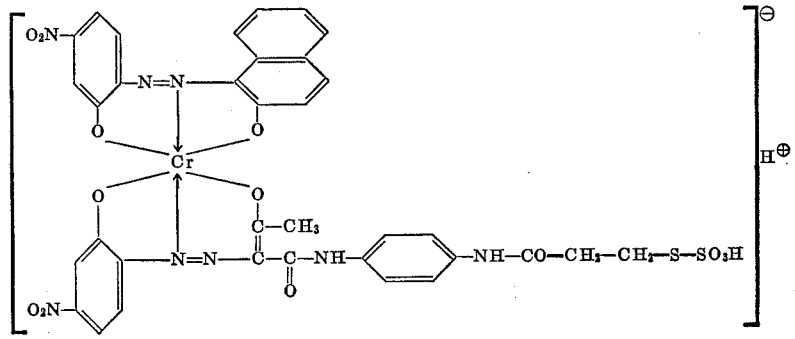

4. The dyestuff of the formula

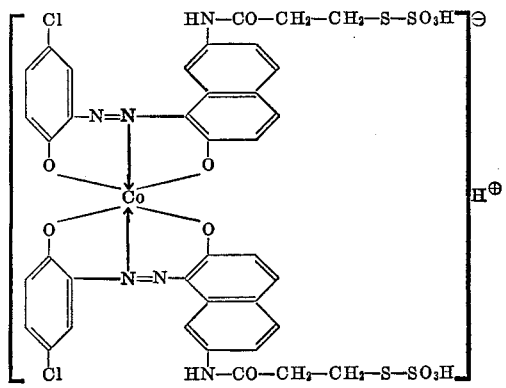

5. The dyestuff of the formula
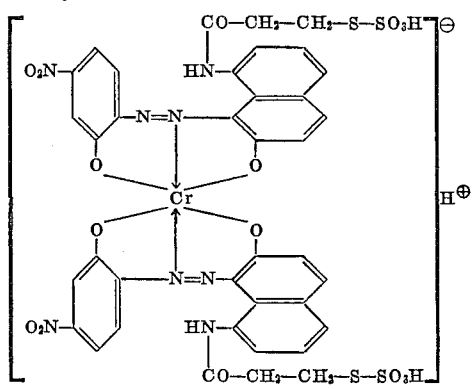
6. The dyestuff of the formula
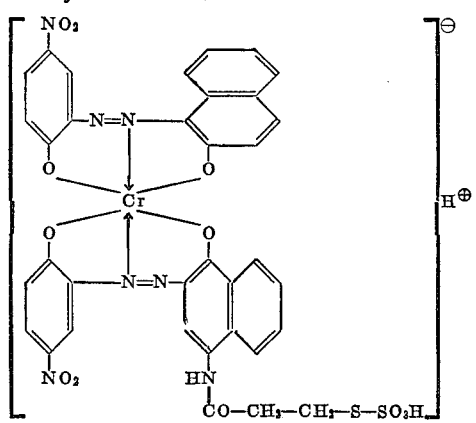
7. The dyestuff of the formula
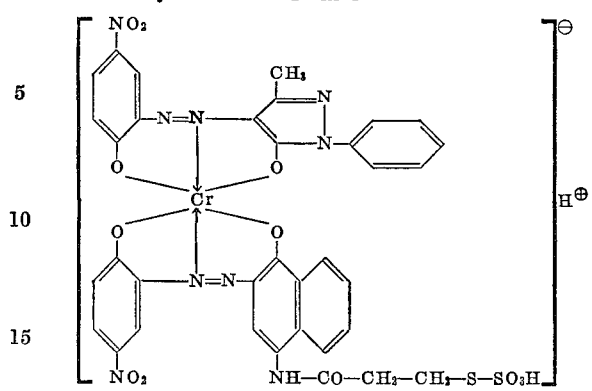
References Cited
UNITED STATES PATENTS
3,226,395  12/1965  Schimmelschmidt et al.
260—163 X
CHARLES B. PARKER, *Primary Examiner.*
D. M. PAPUGA, *Assistant Examiner.*
U.S. Cl. X.R.
260—147, 149, 150, 151, 193, 199, 163, 195, 453, 310, 37; 8—41, 42, 55